(12) United States Patent
Bushey (10) Patent No.: US 9,494,330 B2
(45) Date of Patent: Nov. 15, 2016

(54) SOLAR POWERED VENT FAN SYSTEM AND KIT OF PARTS

(75) Inventor: Thomas Bushey, Chatham (CA)

(73) Assignee: Thomas Bushey, Chatham, ON (CA)

( * ) Notice: Subject to any disclaimer, the term of this patent is extended or adjusted under 35 U.S.C. 154(b) by 658 days.

(21) Appl. No.: 13/575,324

(22) PCT Filed: Jan. 10, 2011

(86) PCT No.: PCT/CA2011/000023
§ 371 (c)(1),
(2), (4) Date: Jul. 26, 2012

(87) PCT Pub. No.: WO2011/091504
PCT Pub. Date: Aug. 4, 2011

(65) Prior Publication Data
US 2012/0302154 A1    Nov. 29, 2012

Related U.S. Application Data

(60) Provisional application No. 61/298,601, filed on Jan. 27, 2010.

(51) Int. Cl.
*F24F 7/06* (2006.01)
*F24F 7/007* (2006.01)
(Continued)

(52) U.S. Cl.
CPC ............... *F24F 7/025* (2013.01); *F24J 2/523* (2013.01); *F24F 2005/0067* (2013.01);
(Continued)

(58) Field of Classification Search
CPC ...................................................... F24F 7/025
(Continued)

(56) References Cited

U.S. PATENT DOCUMENTS 3,934,494 A * 1/1976 Butler ............... F24F 11/0001
454/342
4,123,968 A * 11/1978 Malott ................. F24F 7/025
248/303

(Continued)

OTHER PUBLICATIONS

PCT/CA2011/00023 International Search Report & Written Opinion, dated Jun. 1, 2011.

*Primary Examiner* — Steven B McAllister
*Assistant Examiner* — Jonathan Cotov
(74) *Attorney, Agent, or Firm* — Millman IP Inc.

(57) ABSTRACT

In one aspect, the invention is directed to a kit of parts for a solar powered vent fan system for use in transporting air through a vent aperture (eg. a roof vent aperture) of a building. The kit of parts includes a motor/fan assembly, a motor/fan assembly mounting plate, a solar panel and a solar panel mounting structure. The motor/fan assembly mounting plate is configured to receive the motor/fan assembly and to substantially cover the vent aperture. The motor/fan assembly mounting plate includes a motor/fan assembly aperture to permit air to be transferred through the motor/fan assembly as a result of operation of the motor/fan assembly. The solar panel is connectable electrically to the motor/fan assembly to power the motor/fan assembly. The solar panel mounting structure is for mounting the solar panel in a suitable position to receive solar energy.

12 Claims, 12 Drawing Sheets

(51) Int. Cl.
*F24F 7/02* (2006.01)
*F24J 2/52* (2006.01)
*F24F 5/00* (2006.01)

(52) U.S. Cl.
CPC ................ *Y02B 10/20* (2013.01); *Y02B 10/24* (2013.01); *Y02E 10/47* (2013.01)

(58) Field of Classification Search
USPC ........................................ 454/343, 354, 900
See application file for complete search history.

(56) References Cited

U.S. PATENT DOCUMENTS

| | | | | |
|---|---|---|---|---|
| 4,432,273 A * | 2/1984 | Devitt | ..................... | E04D 13/17 136/291 |
| 4,939,986 A * | 7/1990 | Turner | ..................... | F24C 15/20 454/345 |
| 5,078,047 A * | 1/1992 | Wimberly | ............... | E04D 13/17 454/366 |
| 5,131,888 A * | 7/1992 | Adkins, II | .............. | F24F 7/013 454/343 |
| 5,601,412 A * | 2/1997 | Vice | ....................... | F04D 29/703 416/2 |
| 5,879,232 A * | 3/1999 | Luter, II | ................. | F04D 25/08 454/349 |
| 5,947,816 A * | 9/1999 | Schiedegger | ............ | F24F 7/02 454/241 |
| 6,183,214 B1 * | 2/2001 | Ko | ........................ | F04D 29/601 361/695 |
| 6,695,692 B1 * | 2/2004 | York | ................... | E04D 13/0325 454/199 |
| 7,101,279 B2 * | 9/2006 | O'Hagin | ................... | E04D 1/30 454/364 |
| 7,507,151 B1 * | 3/2009 | Parker | ..................... | F24F 7/025 454/341 |
| 7,677,964 B1 * | 3/2010 | Bucher | .................. | F24F 7/025 454/356 |
| 7,874,348 B2 * | 1/2011 | Liu | ....................... | H01L 23/427 165/104.33 |
| 7,940,525 B2 * | 5/2011 | Letourneau | ........ | H05K 7/20172 361/679.48 |
| 8,776,780 B2 * | 7/2014 | Roseberry | ............... | F24D 3/005 126/563 |
| 2001/0040201 A1 * | 11/2001 | Paxton | .................... | F04D 25/14 248/188.2 |
| 2005/0022549 A1 * | 2/2005 | Anderson | ............. | F25D 17/042 62/317 |
| 2005/0191957 A1 * | 9/2005 | Demetry | ................. | F24F 7/025 454/341 |
| 2007/0072541 A1 * | 3/2007 | Daniels | .................... | F24F 7/02 454/365 |
| 2007/0184775 A1 * | 8/2007 | Perkins | .................. | B60H 1/262 454/273 |
| 2007/0243820 A1 * | 10/2007 | O'Hagin | .................. | F24F 7/025 454/365 |
| 2008/0163576 A1 * | 7/2008 | Oaten | ................... | E04D 13/174 52/302.3 |
| 2008/0299889 A1 * | 12/2008 | Liu | ........................ | F24F 7/007 454/189 |
| 2010/0304660 A1 * | 12/2010 | Boehling | ................ | F24F 7/025 454/343 |
| 2010/0330898 A1 | 12/2010 | Daniels | | |
| 2011/0217194 A1 * | 9/2011 | Randall | ................... | F04D 25/06 417/423.14 |

* cited by examiner

SOLAR POWERED VENT FAN SYSTEM AND KIT OF PARTS

CROSS REFERENCE TO RELATED APPLICATIONS

This application is a national phase entry application of PCT/CA2011/000023, filed Jan. 10, 2011, which claims the benefit of U.S. Provisional Application No. 61/298,601, filed Jan. 27, 2010.

FIELD OF THE INVENTION

The present invention relates to solar powered vent fans (eg. for attic vents).

BACKGROUND OF THE INVENTION

Solar powered attic vent fans are beneficial in that they can reduce the temperature of an attic significantly without a generating a significant energy cost. Such fans, however, are typically relatively complex assemblies of parts and as a result, they are expensive, require a relatively long time to install and need to be installed by a trained technician. Furthermore, in at least some cases, to install the fan, the vent aperture needs to be enlarged by the technician, which can be problematic in the event that a roof rafter is proximate the vent aperture.

It would be beneficial to provide a solar powered vent fan that was relatively inexpensive, that could be installed relatively easily and quickly, and did not require enlarging of the vent aperture (for attics and for other upper rooms in buildings).

SUMMARY OF THE INVENTION

In one aspect, the invention is directed to a kit of parts for a solar powered vent fan system for use in transporting air through a vent aperture of a building (such as, for example, a home, an apartment building, a commercial building, an industrial facility). The vent fan system may be mounted on or near the roof of the building. The vent fan system may be used to remove hot air from an upper portion of the building, such as, for example, an attic in a home. The kit of parts includes a motor/fan assembly, a motor/fan assembly mounting plate, a solar panel and a solar panel mounting structure. The motor/fan assembly mounting plate is configured to receive the motor/fan assembly and to substantially cover the vent aperture. The motor/fan assembly mounting plate includes a motor/fan assembly aperture to permit air to be transferred through the motor/fan assembly as a result of operation of the motor/fan assembly. The solar panel is connectable electrically to the motor/fan assembly to power the motor/fan assembly. The solar panel mounting structure is for mounting the solar panel in a suitable position to receive solar energy.

In a particularly preferred embodiment, the motor/fan assembly has a peripheral flange, and the motor/fan assembly mounting plate includes at least one first clip that captures the peripheral flange of the motor/fan assembly and at least one second clip that is resiliently deflectable from a rest position wherein the at least one second clip is positioned to capture the peripheral flange, to a deflected position to permit the peripheral flange to move therepast. The mounting plate includes an anti-rotation wall that abuts the motor/fan assembly to prevent rotation thereof during use. The at least one first clip, the at least one second clip and the anti-rotation wall cooperate to permit the motor/fan assembly to be inserted into the mounting plate for capture therein without tools.

In another aspect, the invention is directed to a solar powered vent fan system that includes a motor/fan assembly, a motor/fan assembly mounting plate, a solar panel and a solar panel mounting structure.

In another aspect, the invention is directed to a solar powered vent fan system that includes a motor/fan assembly and a solar panel that can cooperate with an existing roof vent so as not to require the removal and discarding of the roof vent. Furthermore, the installation of the vent fan system can be achieved without complete removal of the existing vent.

BRIEF DESCRIPTION OF THE DRAWINGS

The present invention will now be described by way of example only with reference to the attached drawings, in which.

DETAILED DESCRIPTION OF THE INVENTION

In this specification and in the claims, the use of the article "a", "an", or "the" in reference to an item is not intended to limit an embodiment to include only one of the item. It will be apparent to one skilled in the art in at least some instances in this specification and the attached claims that it would be possible to include a plurality of the item in at least some embodiments of the invention.

Figure 1:
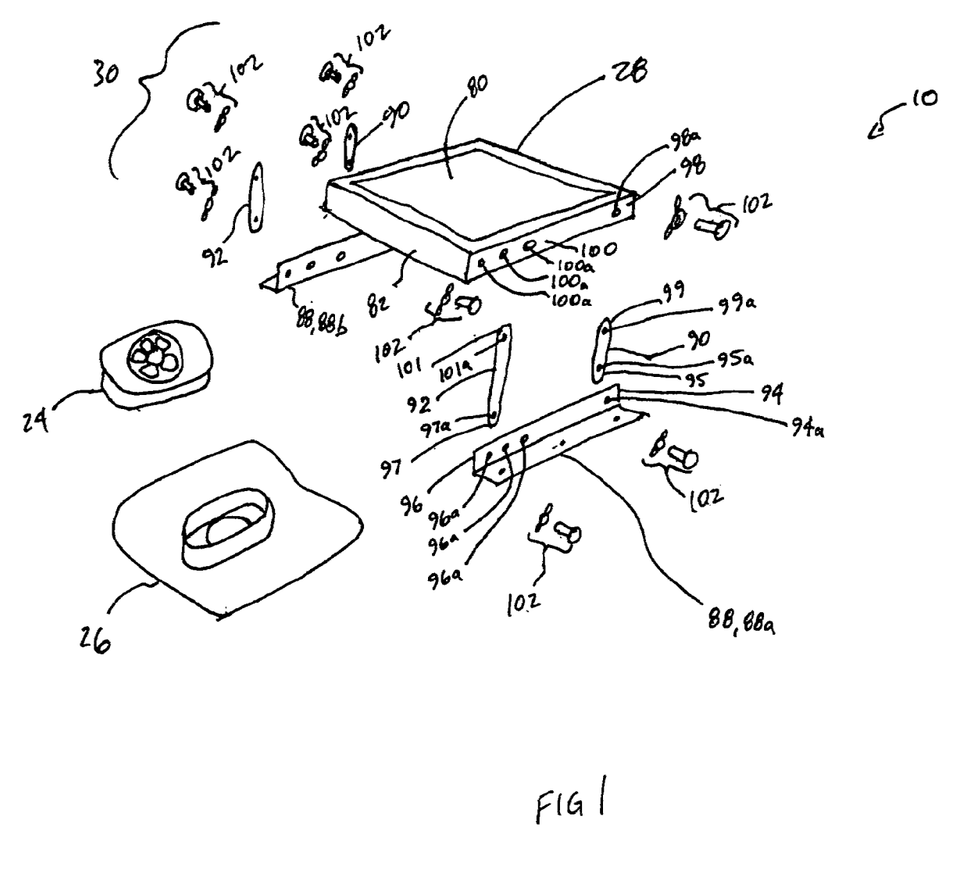
FIG. 1 is a perspective view of a kit of parts for a solar powered attic vent fan system for use in exhausting air from a vent aperture of a building.

Reference is made to FIG. 1, which shows a kit of parts 10 for a solar powered attic vent fan system 12 (FIG. 2) for use in exhausting air from a vent aperture 14 (FIG. 2) of a building 16. The building 16 may be any suitable type of building, such as a home, a multi-unit residential building such as an apartment building, a manufacturing facility or a commercial building.

Figure 2:
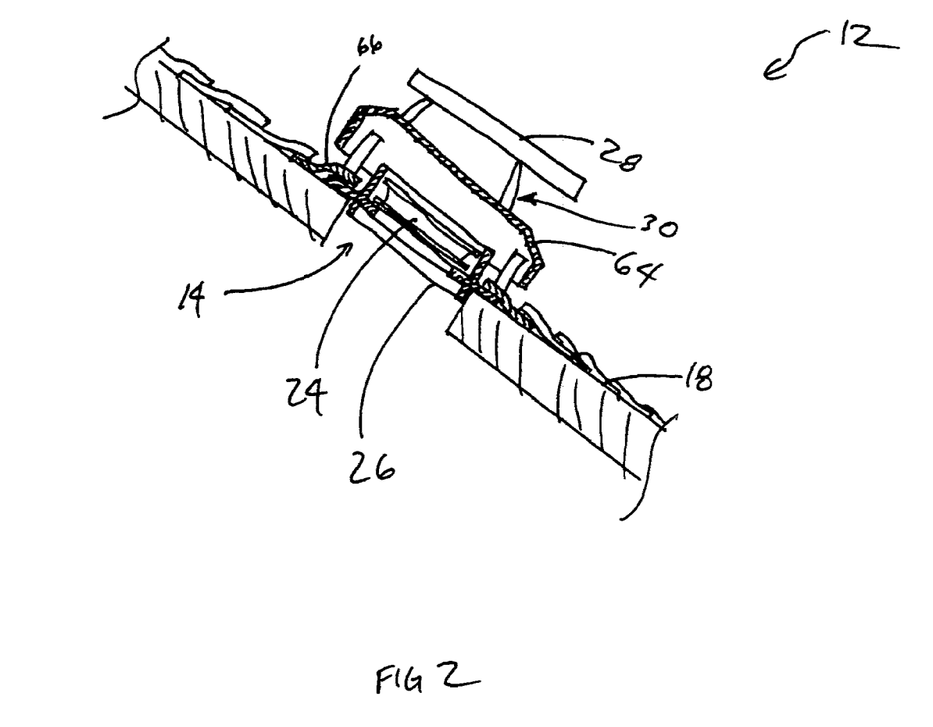
FIG. 2 is a sectional elevation view of a solar powered attic vent fan system made from the kit of parts shown in FIG. 1, installed in an attic vent aperture in a roof of a home.
Figure 3:
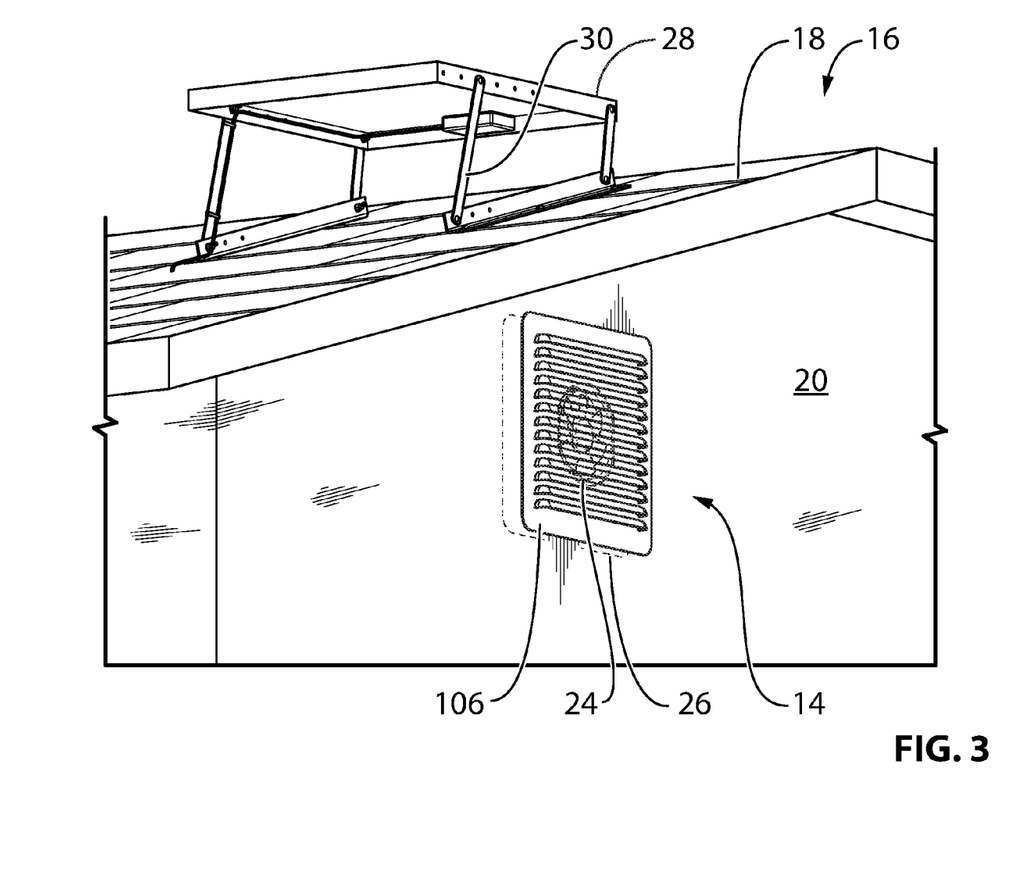
FIG. 3 is a perspective view of a solar powered attic vent fan system made from the kit of parts shown in FIG. 1, installed in an attic vent aperture in a gable of a home.

The vent aperture 14 may be any suitable type of vent aperture, such as an attic vent aperture. The vent aperture 14 may be through the roof, shown at 18, of the building 16, as shown in FIG. 2. Such a vent aperture is typically about 8 inches across. Alternatively, as shown in FIG. 3, the vent aperture 14 may be through a wall 20 of the building, eg. through a gable on a home. In another alternative, the attic vent aperture 14 may be on a soffit of a home, shown at 22 in FIG. 4a.

The kit of parts 10 includes a motor/fan assembly 24, a motor/fan assembly mounting plate 26, a solar panel 28 and a solar panel mounting structure 30. The kit of parts 10 preferably permits the mounting of the solar powered attic vent fan system 12 to different sizes of vent apertures 14. Also, the kit of parts 10 preferably permits the mounting of the solar powered attic vent fan system 12 quickly and with few tools, and certain components may be mounted toollessly.

Figure 5:
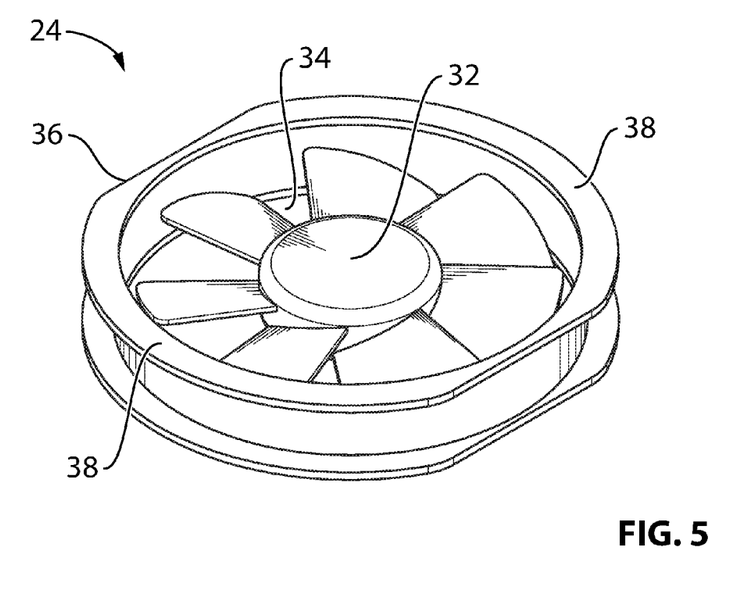
FIG. 5 is a perspective view of a motor/fan assembly that is part of the kit of parts shown in FIG. 1.

Referring to FIG. 5, the motor/fan assembly 24 includes a motor 32, a fan 34 that is driven by the motor 32, and a housing 36. The housing 36 has a flange 38 thereon that is used for the mounting of the motor/fan assembly 24 to the motor/fan assembly mounting plate 26. The flange 38 may be split into two sections, as shown in FIG. 5, or alternatively, the flange 38 may extend all the way around the perimeter of the housing 36. The housing 36 may be selected to have a size that fits substantially universally on most vent apertures 14. For example, the housing 36 may have a 6" diameter so that it is likely to fit in most vent apertures 14 which may be, for example, 8" across or larger.

Figure 6:
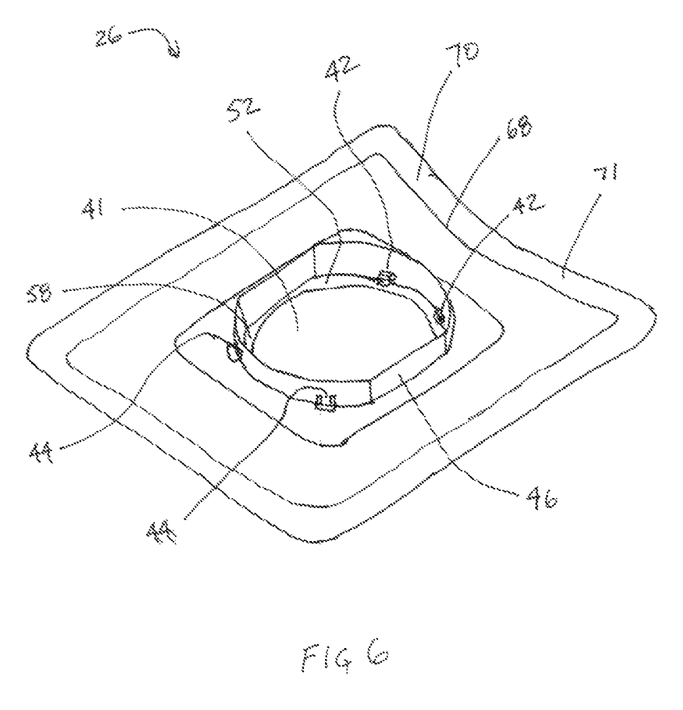
FIG. 6 is a perspective view of a motor/fan assembly mounting plate that is used to receive the motor/fan assembly shown in FIG. 5.
Figure 7:
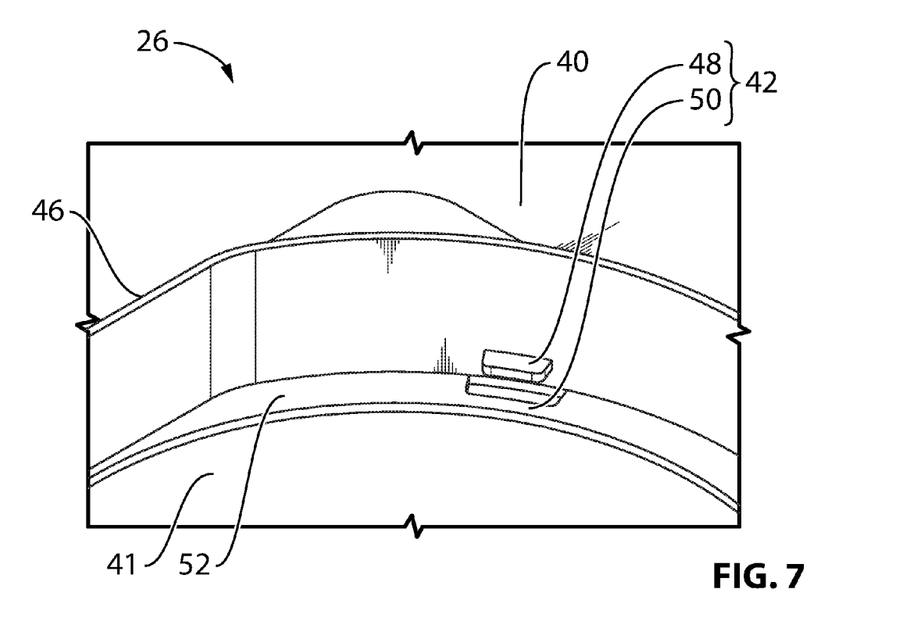
FIG. 7 is a magnified perspective view of a portion of the motor/fan assembly mounting plate shown in FIG. 6.
Figure 8:
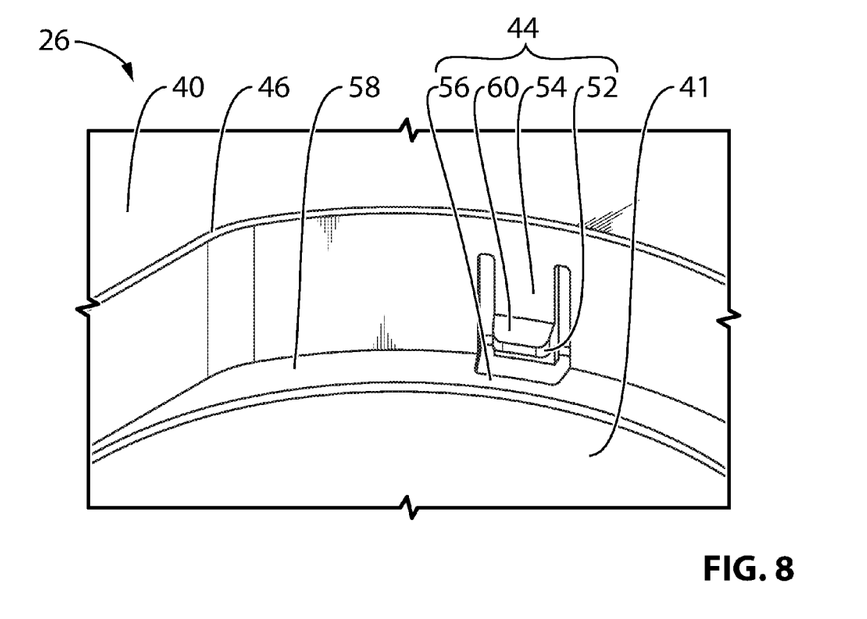
FIG. 8 is a magnified perspective view of another portion of the motor/fan assembly mounting plate shown in FIG. 6.

Referring to FIG. 6, the motor/fan assembly mounting plate 26 includes a vent aperture cover portion 40, a motor/fan assembly aperture 41, a pair of first clips 42, a pair of second clips 44 and an anti-rotation wall 46. Referring to FIG. 7, the first clips 42 include upper shoulders 48 and lower shoulders 50 that are integrally connected together as part of a flange portion 52. Referring to FIG. 8, the second clips 44 include upper shoulders 52 that are mounted on resilient flange locking arms 54 that are connected to the anti-rotation wall 46, and lower shoulders 56 that are integrally connected together as part of a flange portion 58. The anti-rotation wall 46 cooperates with the motor/fan assembly 24 to prevent the rotation of the motor/fan assembly 24 during use. In the embodiment shown in FIG. 6, the anti-rotation wall 46 is configured to entirely surround the motor/fan assembly 24, and, together with the flange portions 52 and 58, to form a seat for receiving the motor/fan assembly 24.

A guide surface 60 on each of the arms 54 permits the arms 54 to be deflected out of the way when the motor/fan assembly 24 is inserted into the seat. Once inserted past the guide surface 60, the resilient arm 54 brings the upper shoulder 52 back to a home position wherein it is positioned to cooperate with the lower shoulder 56 to capture the flange 38 on the motor/fan assembly 24. To install the motor/fan assembly 24 in the motor/fan assembly mounting plate 26, a first end 62 of the motor/fan assembly 24 is inserted into the seat at an angle so that the flange 38 is captured between the upper and lower shoulders 48 and 50 on the first clips 42. A second end of the motor/fan assembly 24 is then lowered down into the seat, deflecting the arms 54 out of the way (ie. to a deflected position) until it is in place against the flange portion 58. Once the motor/fan assembly 24 is in place against the flange portion 58, the resilient arms 54 return to their rest positions, so that the upper shoulders 52 and the upper shoulders 48 on the first clips 42 together prevent the motor/fan assembly 24 from lifting out of the seat.

The motor/fan assembly mounting plate 26 preferably covers substantially the entirety of the vent aperture 14. Covering the vent aperture 14 prevents hot air that is outside of the building from entering the building to fill a low pressure zone in the attic created by the suction of the fan 34 during use (in particular for gable and roof mounted units).

Figure 9:
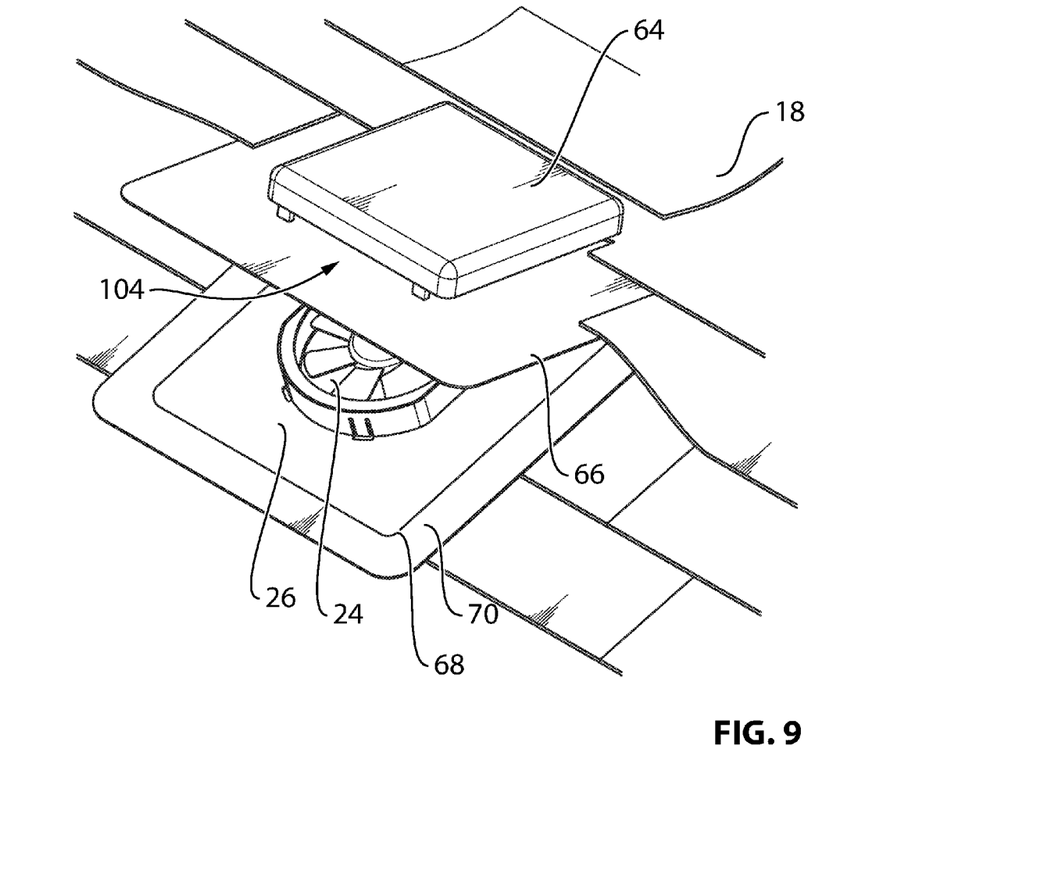
FIG. 9 is a perspective view illustrating a step in the installation of the motor/fan assembly shown in FIG. 5 and mounting plate shown in FIG. 6 on a roof.

Referring to FIG. 9, to mount the motor/fan assembly 24 and mounting plate 26 to the roof 18, the installer lifts the passive vent member, shown at 64, that covers the vent aperture (hidden from view in this figure). The passive vent member 64 may be referred to as a low profile vent or by a number of other names used in the art. The installer then slides the motor/fan assembly mounting plate 26 with the motor/fan assembly 24 mounted thereon, under the vent member 64. The motor/fan assembly mounting plate 26 is preferably sized to fit within the borders of the plate portion, shown at 66, of the vent member 64. In order to permit the motor/fan assembly mounting plate 26 to be adjusted in size as desired, the motor/fan assembly mounting plate 26 may be made from a polymeric material, such as, for example, polypropylene, and may have at least one score thereon, shown at 68, to permit a user to remove a peripheral portion 70 of the mounting plate 26 so as to reduce its size. Preferably, as shown in FIG. 6, the score 68 extends about the entire periphery at a generally constant distance inward from the edge of the mounting plate 26 so that the motor/fan assembly 24 remains centered on the mounting plate 26 whether or not the installer removes the peripheral portion 70.

To assist in inserting the motor/fan assembly mounting plate 26 into place under the vent member 64, the motor/fan assembly mounting plate 26 may have a leading edge 71 (FIG. 6) that is generally V-shaped. As shown in FIG. 6, the leading edge 71 may have a concavity that forms the v-shape so that its forwardmost points are proximate the side edges. Alternatively, the leading edge 71 may have a generally convex shape so that its forwardmost point is generally centered laterally and the rearwardmost points of its leading edge are proximate the side edges.

The mounting plate 26 may be made to be any suitable size. For example, it may be approximately 14 inches×16 inches. The score 68 may be approximately 1 inch from the edge of the mounting plate 26. As noted above, further scores may be provided on the mounting plate 26 to facilitate installation.

Figure 10:
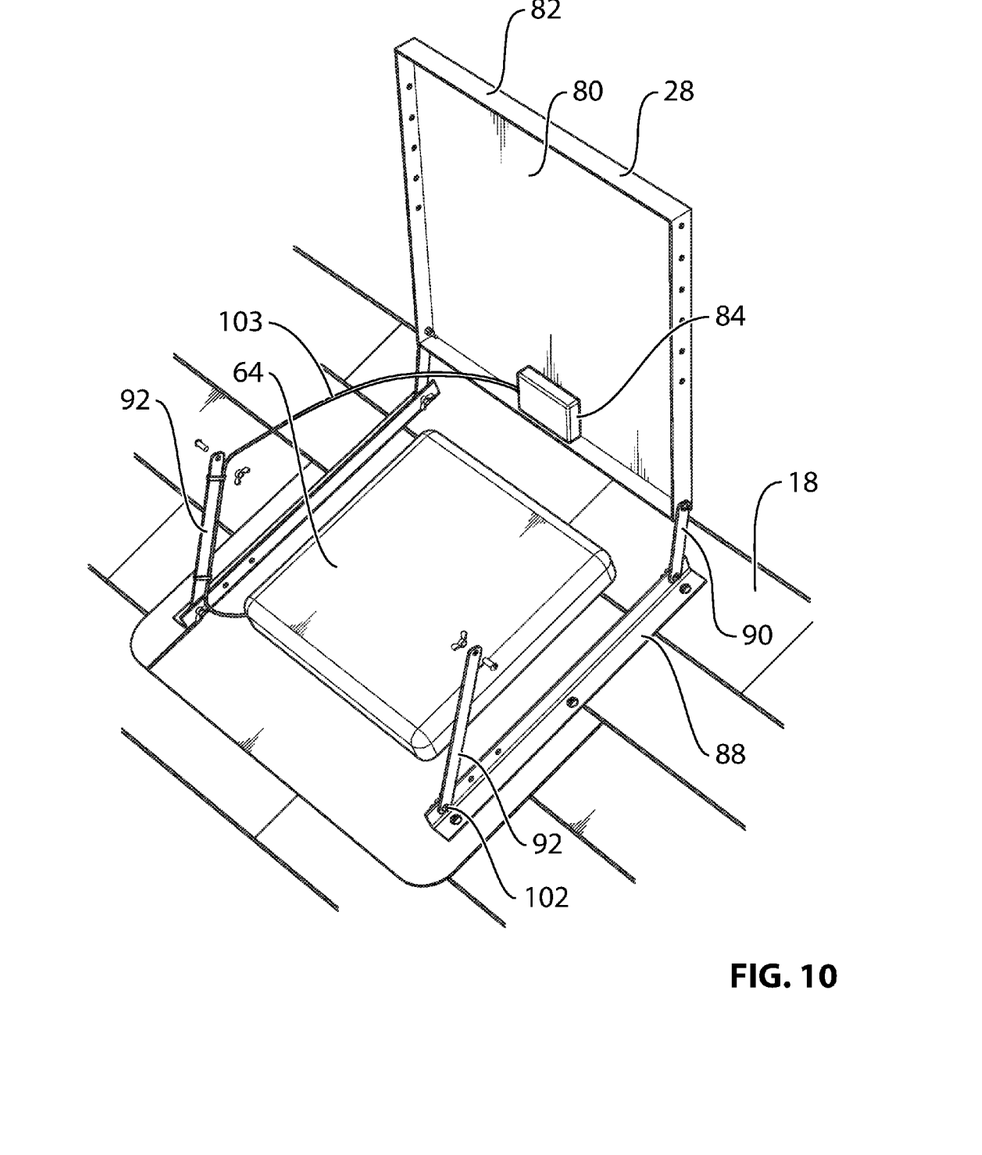
FIG. 10 is a perspective view illustrating a step in the installation of a solar panel that is part of the kit of parts shown in FIG. 1, on a roof.

Reference is made to FIG. 10. The solar panel 28 includes a photovoltaic member 80, a frame 82 and a controller 84. The solar panel 28 is mountable on the roof 18 via the solar panel mounting structure 30.

Referring to FIG. 1, the solar panel mounting structure 30 includes first and second angle brackets 88 (shown individually 88a and 88b) and first and second arms 90 and 92 mounted between each bracket 88 and the frame 82. The brackets and the arms 90 and 92 may be made from any suitable material, such as aluminum. The term aluminum is not to be interpreted as meaning strictly pure aluminum. It is intended to encompass both pure aluminum and aluminum alloys. Each bracket 88 may be mounted to the roof 18 by mechanical fasteners (eg. wood screws). The brackets 88 may be positioned on each side of the vent member 64 for supporting the solar panel 28 in a position above the vent member 64. Each bracket 88 has a first apertured section 94 including at least one arm mounting aperture 94a for connecting with a first end aperture 95a on a first end 95 of the first arm 90, and a second apertured portion 96 including a plurality of arm mounting apertures 96a for connecting with a first end aperture 97a on a first end 97 of the second arm 92. Each side of the solar panel frame 82 has a third apertured portion 98 including at least one arm mounting aperture 98a for connecting with a second end aperture 99a on a second end 99 of the first arm 90, and a fourth apertured portion 100 including a plurality of apertures 100a for connecting with a second end aperture 101a on a second end 101 of the second arm 92. The connection between the arm 90, 92 and the bracket 88 or frame 82 is made by aligning the respective arm mounting aperture 94a, 96a, 98a, 100a with the respective end aperture 95a, 97a, 99a, 101a and passing a mechanical fastener 102 (eg. a machine screw and wing nut) through the aligned apertures. Selecting which apertures 96a and 100a to use for the mounting of the first end 97 and second end 101 of the second arm 92 controls the angle of the solar panel 28 on the roof 18. By providing this adjustability for the solar panel 28, when solar panels 28 are installed on roofs 18 having different angles, each solar panel 28 can be installed at a customized angle that is advantageous in terms of collection of solar energy.

While a plurality of apertures 96 and 100 are described as being provided on the bracket 88 and the solar panel frame 82, it will be understood that other alternatives for providing an adjustable angle for the solar panel 28 are possible. For example, a plurality of apertures 94 could be provided on each bracket 88 for the first end of the first arm 90. Alternatively or additionally, a plurality of apertures 98 may be provided on each side of the frame 82 of the solar panel 28 for receiving the second end of the first arm 90. It is possible to provide a plurality of apertures 94 and/or a plurality of apertures 98 regardless of whether a plurality of apertures 96 and 100 are provided.

As shown in FIG. 10, to connect the motor/fan assembly (not shown in this figure) and the solar panel 28, the installer pulls an electrical conduit 103 from the motor/fan assembly through the air passage 104 (best seen in FIG. 9) of the vent member 64, and connects it to the controller 84. Quick-disconnect electrical connectors may be used between the electrical conduit 103 and the controller 84 to reduce the time required to install the attic vent fan system 12.

Figure 11:
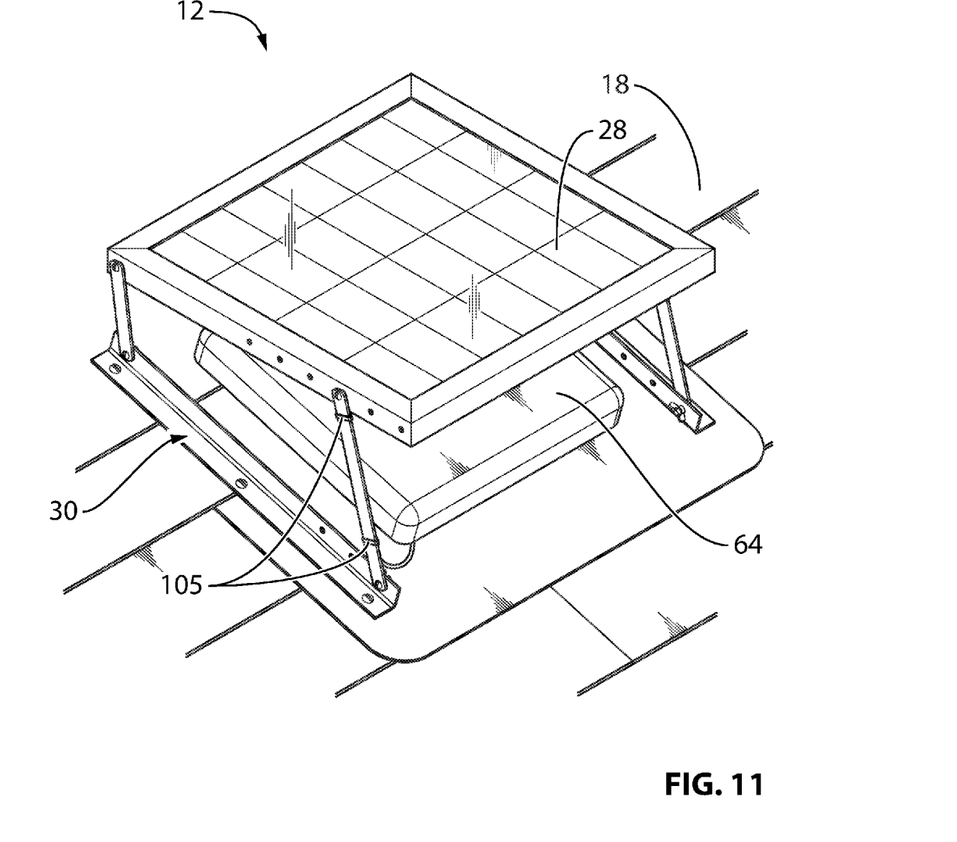
FIG. 11 is a perspective view of the installed solar powered attic vent fan system shown in FIG. 2.

At some point after the motor/fan assembly 24 and mounting plate 26 have been mounted and optionally after the solar panel 28 is mounted, the vent member 64 can be re-fastened to the roof 18 where it had been lifted for the insertion of the motor/fan assembly 24 and mounting plate 26 (FIG. 11). Cable ties shown at 105 may be used to secure the electrical conduit 103 along one of the second arms 92 to protect the conduit 103 somewhat from the weather.

While two first arms 90 and two second arms 92 are shown in the figures for the mounting of the solar panel 28, it is alternatively possible to provide some other mounting arrangement that may or may not be adjustable in angle.

The system 12 may include controls as desired, (eg. to prevent overheating of the motor 32 and to control operation of the system 12 in other ways).

The overheated room may be the attic or a similar room at the top level in a home. The room may be overheated for several reasons. For example, in a home there is a natural tendency for hot air to rise to the uppermost floor of the home, so that there is an upward temperature gradient with each successively higher floor level in the home. As a result, the uppermost floor is typically the warmest during hot weather. Additionally, the uppermost floor of the home may be the least protected thermally from the exterior of the home, and so heat may be transferred into the uppermost level (eg. the attic) through the walls and roof of the home. Use of the attic vent fan system 12 entails operation of the fan 34 using energy collected by the solar panel 28, to remove hot air from the overheated room and to blow the removed air outside. As a result of the reduced pressure in the room in which air was removed, other cooler air from within the building (eg. from a lower floor in the home) or through the air inlets (typically mounted proximate the lower edge of the roof) enters and cools the overheated room. This cooling can be significant. Furthermore the cost associated with the energy consumption required to operate the fan is only the cost to install and maintain the system 12, since it operates using solar power. In one test setup, the energy consumption for the home without the system 12 (where a typical attic vent was provided), was 41 kWh in a month, and the energy consumption for the home after the system 12 was installed was 12 kWh in a month.

The installation of the attic vent fan system 12 is relatively simple, relatively inexpensive and requires less time to complete as compared to attic vent fan systems 12 of the prior art. As a result, the system 12 may be adopted for use by a relatively greater number of people, which can reduce the amount of energy consumption overall, thereby having a positive environmental effect.

As mentioned above, aside from being installable on a roof vent as shown in FIG. 1, it is alternatively possible to install the system 12 elsewhere, such as in a vent on a gable as shown in FIG. 3. In the embodiment shown in FIG. 3, the solar panel 28 is mounted on the roof 18, while the motor/fan assembly 24 and mounting plate 26 are mounted behind the louvered vent member, shown at 106.

Figure 4A:
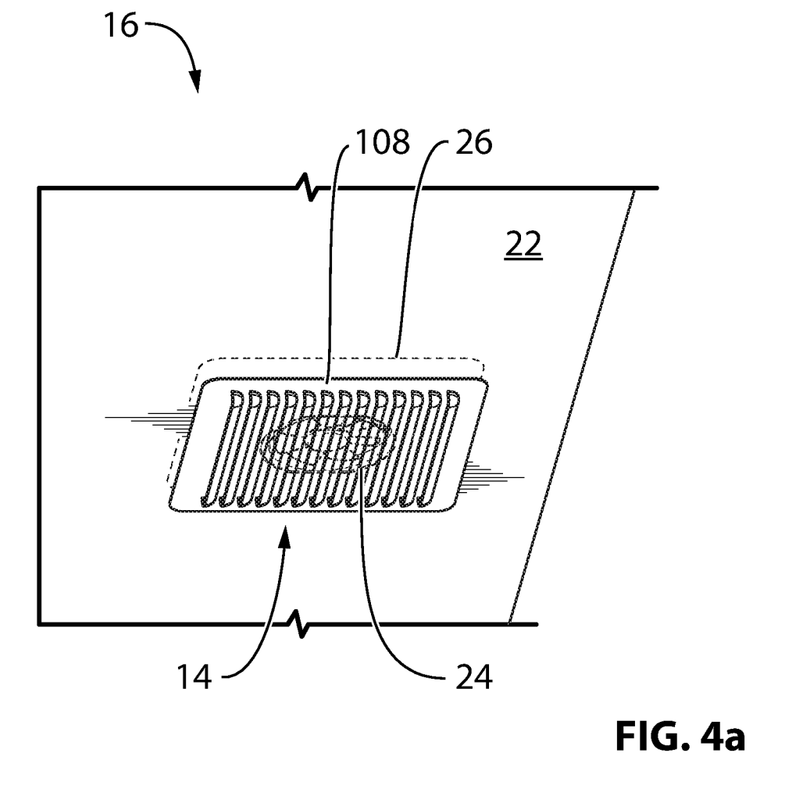
FIGS. 4a and 4b are perspective views of portions of a solar powered attic vent fan system made from the kit of parts shown in FIG. 1, installed in a vent aperture in a soffit under a roof.
Figure 4B:
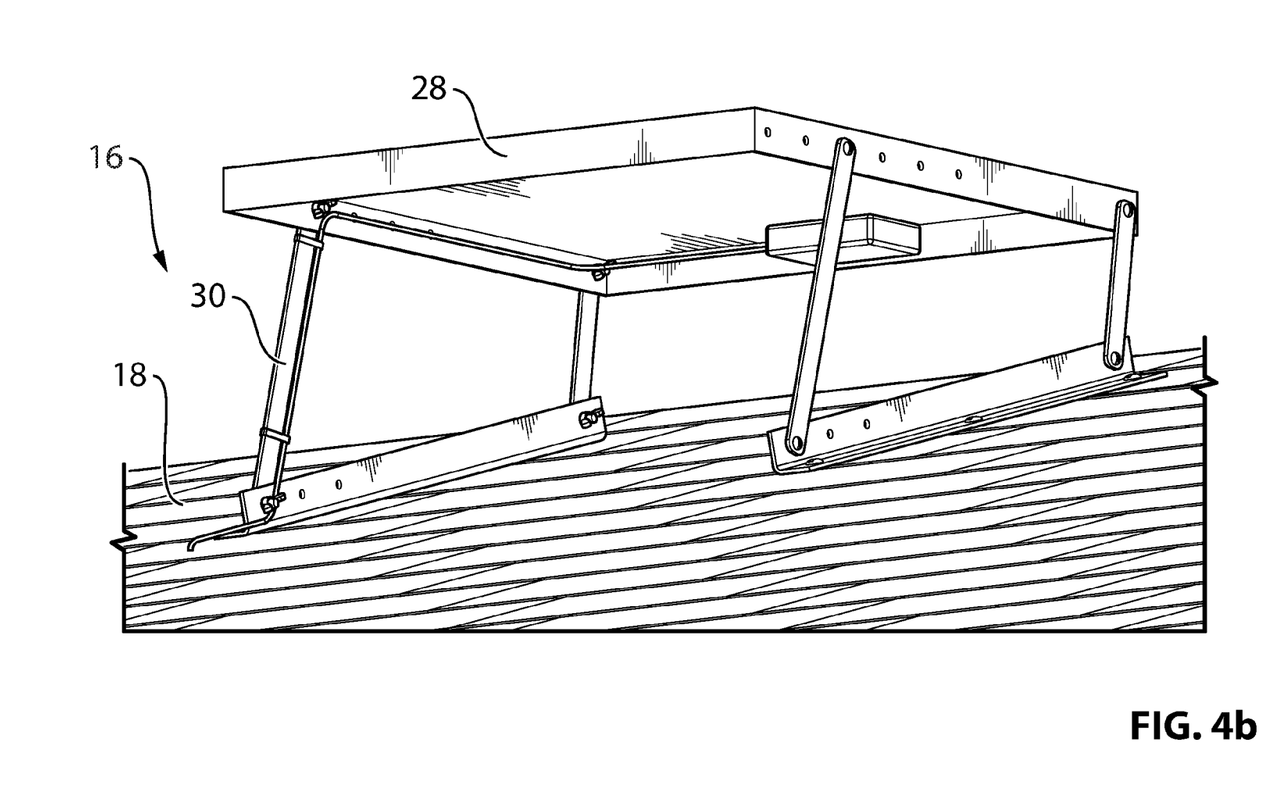

As shown in FIG. 4a the motor/fan assembly 24 and motor/fan assembly mounting plate 26 can be mounted in a soffit vent aperture 22. In this installation, again the solar panel 28 is mounted on the roof 18 (FIG. 4b), while the motor/fan assembly 24 and motor/fan assembly mounting plate 26 are mounted behind a louvered vent member, shown at 108 on the soffit vent. The fan in this installation may be configured to transport air in from the exterior of the louvered vent member 108 upwards along the interior surface of the roof 18 and out through a vent (not shown) on the roof 18.

As can be seen, the system 10 shown and described herein can cooperate with the existing vent 64, without the need for discarding the vent 64 and without the need to modify the vent aperture 14, as some vent fan systems of the prior art entail. These features make the system 10 relatively inexpensive and easy and quick to install. It will be noted further that the roof vent 64 does not require complete removal to carry out the installation of the vent fan system 10. In the embodiment shown, a few fasteners that hold one end of the existing vent 64 to the roof are removed from the roof, permitting one end of the vent 64 to be lifted, in turn permitting the motor/fan assembly 24 to be inserted underneath the vent 64 into place at the vent aperture 14. As can be seen the solar panel 28 mounted around and above the vent 64. In an embodiment wherein the existing vent 64 is too large or unsuitably shaped to permit the mounting of the solar panel above it, it is optionally possible to mount the solar 28 adjacent the vent 64 instead of above it, still using the brackets 88 and arms 90 and 92. Preferably care would be taken to ensure that the vent 64 does not block the solar panel 28 from receiving the rays of the sun in such an instance.

While the system 10 is shown being installed around a typical square roof vent, it can also be configured (simply with arms 90 and 92 of a suitable length) to be able to cooperate with a preexisting turbine vent or other kinds of vent.

While the above description constitutes a plurality of embodiments of the present invention, it will be appreciated that the present invention is susceptible to further modification and change without departing from the fair meaning of the accompanying claims.

The invention claimed is:

1. A kit of parts for a solar powered attic vent fan system for use in transporting air through a vent aperture to a roof or soffit of a building, comprising:
   a motor/fan assembly;
   a motor/fan assembly mounting plate that is mounted about a vent aperture of a building and is stationary, and that is configured to receive the motor/fan assembly and is sized to sit on an exterior face of the roof or soffit and to substantially cover the vent aperture, wherein the motor/fan assembly mounting plate includes a motor/fan assembly aperture to permit air to be transferred through the motor/fan assembly as a result of operation of the motor/fan assembly;
   a solar panel that is connectable electrically to the motor/fan assembly to power the motor/fan assembly; and
   a solar panel mounting structure for mounting the solar panel to receive solar energy,
   wherein the motor/fan assembly has a peripheral flange, and wherein the motor/fan assembly mounting plate includes at least one first clip that captures the peripheral flange of the motor/fan assembly and at least one second clip that is resiliently deflectable from a rest position wherein the at least one second clip is positioned to capture the peripheral flange, to a deflected position to permit the peripheral flange to move therepast,
   wherein the mounting plate includes a flange portion positioned to support the motor/fan assembly when the peripheral flange of the motor/fan assembly is captured by the first and second clips,
   and wherein the mounting plate includes an anti-rotation wall that provides a non-cylindrical shape to the mounting plate and that abuts the motor/fan assembly in such a way as to prevent rotation of the motor/fan assembly relative to the vent aperture, wherein the at least one first clip, the at least one second clip and the anti-rotation wall cooperate to permit the motor/fan assembly to be inserted into the mounting plate for capture therein without tools.

2. A kit of parts as claimed in claim 1, wherein the vent aperture has an edge and the motor/fan assembly mounting plate extends outward beyond the edge of the vent aperture.

3. A kit of parts as claimed in claim 1, wherein the mounting plate is made from a polymeric material and has at least one score thereon to permit a user to remove a peripheral portion of the mounting plate so as to reduce the size of the mounting plate.

4. A kit of parts as claimed in claim 1, wherein the mounting plate is made from a polymeric material and has a peripheral edge, and has a score thereon that extends about the entire periphery of the mounting plate at a selected, generally constant distance from the peripheral edge of the mounting plate to permit a user to cut the mounting plate along the score to remove a peripheral portion of the mounting plate so as to reduce the size of the mounting plate.

5. A kit of parts as claimed in claim 1, wherein the mounting plate has a leading edge that is V-shaped to facilitate insertion under a passive vent member configured to cover the vent aperture.

6. A kit of parts as claimed in claim 1, wherein the solar panel mounting structure includes
   a bracket that is mountable to a roof of the building, and
   at least first and second arms that are mountable between the bracket and the solar panel to hold the solar panel in at least two angular positions.

7. A kit of parts as claimed in claim 6, wherein the bracket has a first apertured section for connecting with a first end of the first arm and a second apertured section for connection with a first end of the second arm, and wherein the solar panel has a third apertured section for connecting with a second end of the first arm and a fourth apertured section for connecting with a second end of the second arm, wherein at least one of the first, second, third and fourth apertured sections includes a plurality of arm mounting apertures for connecting with one of the ends of one of the first and second arms, and the remaining apertured sections each have at least one arm mounting aperture for connecting with the remaining ends of the first and second arms, wherein the angle of the solar panel is at least partially determined by which of the plurality of arm mounting apertures is used for connecting with the said one of the ends of one of the first and second arms.

8. A kit of parts as claimed in claim 7, wherein at least one of the first and second apertured sections includes a plurality of apertures and at least one of the third and fourth apertured sections includes a plurality of apertures.

9. A kit of parts as claimed in claim 7, wherein any arm mounting apertures in the first, second, third and fourth apertured sections are alignable with an end aperture in each end of the first and second arms for the pass-through of a mechanical fastener.

10. A kit of parts as claimed in claim 1, wherein the flange portion of the mounting plate extends inwardly from the anti-rotation wall and the cover portion extends outwardly from the anti-rotation wall.

11. A kit of parts for a solar powered attic vent fan system for use in transporting air through a vent aperture to a roof or soffit of a building, comprising:
    a motor/fan assembly;
    a motor/fan assembly mounting plate that has a vent aperture cover portion that is sized to sit on an exterior face of the roof or soffit and to substantially cover the vent aperture, and that has a motor/fan assembly aperture sized to receive the motor/fan assembly and to permit air to be transferred through the motor/fan assembly as a result of operation of the motor/fan assembly, and wherein the mounting plate is shaped to project from the vent aperture cover portion into the vent aperture proximate an edge of the vent aperture, so as to align the motor/fan assembly aperture with the vent aperture;
    a solar panel that is connectable electrically to the motor/fan assembly to power the motor/fan assembly; and
    a solar panel mounting structure for mounting the solar panel to receive solar energy,
    wherein the motor/fan assembly has a peripheral flange, and wherein the motor/fan assembly mounting plate includes at least one first clip that captures the peripheral flange of the motor/fan assembly and at least one second clip that is resiliently deflectable from a rest position wherein the at least one second clip is positioned to capture the peripheral flange, to a deflected position to permit the peripheral flange to move therepast, wherein the mounting plate includes a flange portion positioned to support the motor/fan assembly when the peripheral flange of the motor/fan assembly is captured by the first and second clips, and wherein the mounting plate includes an anti-rotation wall that provides a non-cylindrical shape to the mounting plate and that abuts the motor/fan assembly in such a way as to prevent rotation of the motor/fan assembly relative to the vent aperture during use of the motor/fan assembly, wherein the at least one first clip, the at least one second clip and the anti-rotation wall cooperate to permit the motor/fan assembly to be inserted into the mounting plate for capture therein without tools.

12. A kit of parts as claimed in claim 11, wherein the flange portion of the mounting plate extends inwardly from the anti-rotation wall and the cover portion extends outwardly from the anti-rotation wall.

* * * * *